(12) United States Patent
 Perez

(10) Patent No.: US 8,798,040 B2
(45) Date of Patent: Aug. 5, 2014

(54) REMOTE SERVICE IDENTIFIER

(71) Applicant: Verizon Patent and Licensing Inc., Basking Ridge, NJ (US)

(72) Inventor: John Scott Perez, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 117 days.

(21) Appl. No.: 13/649,728

(22) Filed: Oct. 11, 2012

(65) Prior Publication Data

US 2014/0105207 A1    Apr. 17, 2014

(51) Int. Cl.
 *H04L 12/66* (2006.01)
 *H04L 12/58* (2006.01)
 *H04W 4/12* (2009.01)
 *H04M 3/42* (2006.01)

(52) U.S. Cl.
 USPC ............ 370/352; 370/395.2; 370/395.3

(58) Field of Classification Search
 CPC ... H04M 3/46; H04M 3/436; H04M 3/42059; H04M 3/42034
 See application file for complete search history.

(56) References Cited

U.S. PATENT DOCUMENTS

| | | | |
|---|---|---|---|
| 2002/0118671 A1* | 8/2002 | Staples et al. | 370/352 |
| 2006/0165068 A1* | 7/2006 | Dalton et al. | 370/352 |
| 2006/0198351 A1* | 9/2006 | Baek | 370/338 |
| 2010/0217837 A1* | 8/2010 | Ansari et al. | 709/218 |

* cited by examiner

Primary Examiner — Asad Nawaz
Assistant Examiner — Jason Harley

(57) ABSTRACT

A method includes receiving a signaling protocol message associated with a voice over Internet Protocol (VoIP) call. The method includes identifying a From value of the signaling protocol message. The From value includes at least one symbol. The method includes converting each symbol of the From value to a corresponding American Standard Code for Information Exchange (ASCII) decimal value. A To value of the at least one signaling protocol message is identified. The To value includes at least one symbol. The method includes converting each symbol of the To value to a corresponding ASCII decimal value. The ASCII decimal value of the From value is compared to the ASCII decimal value of the To value to determine a larger integer and a smaller integer. The method includes concatenating the larger integer and the smaller integer to form a remote service identifier based on a predetermined sequence.

20 Claims, 11 Drawing Sheets

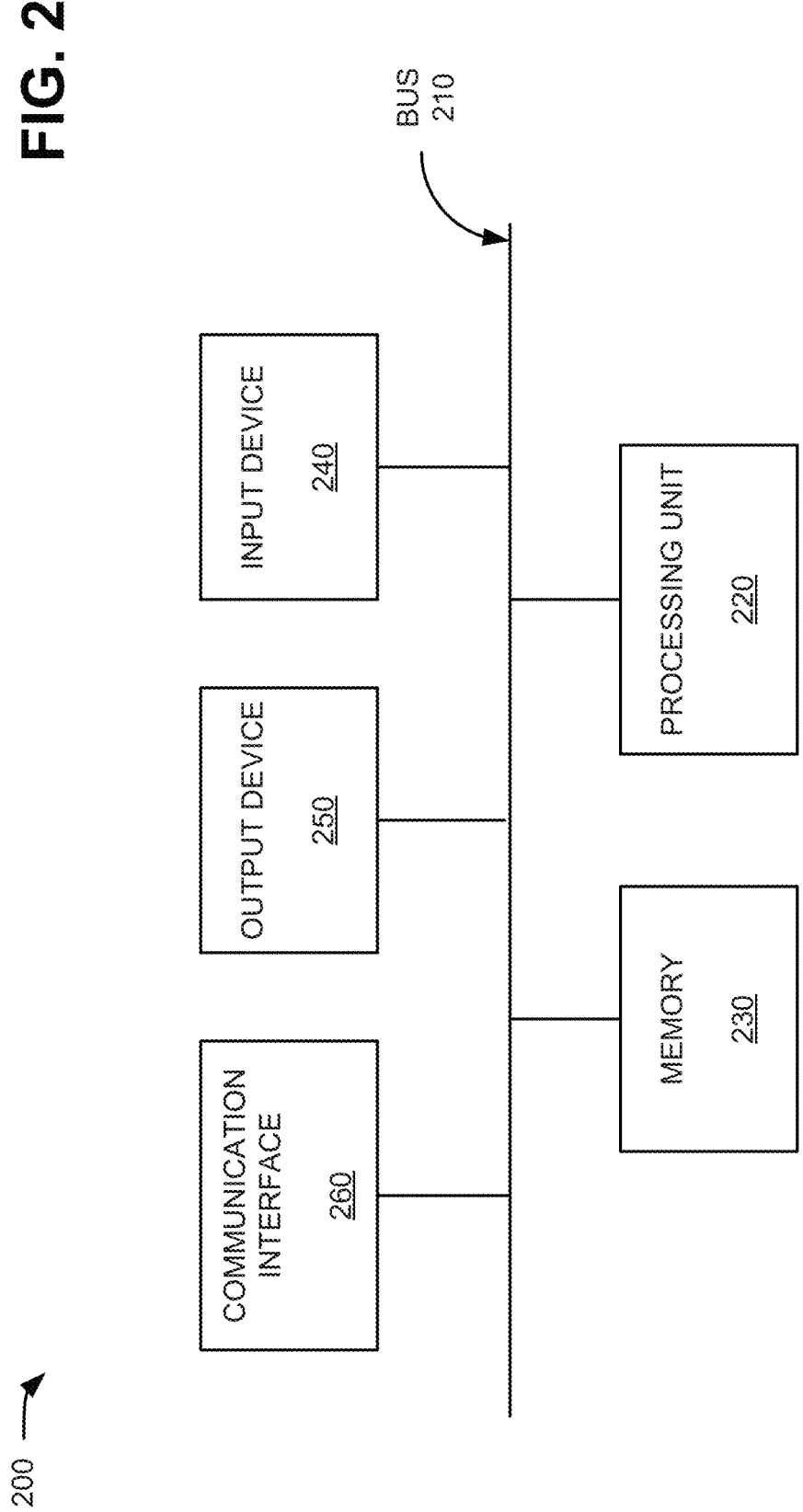

308

Via: SIP/2.0/UDP proxy.acme.com:5060
From: UserA <sip:UserA@acme.com>
To: UserB <sip:UserB@acme.com>
Call-ID: 123456000@acme.com
CSeq: 1 INVITE
Subject: Meeting Today
Contact: sip:UserA@100.101.102.103
Content-Type: application/sdp
Content-Length: 147 v=0
o=UserA 2890844526 IN IP4 acme.com
s=Example Session SDP
c=IN IP4 100.101.102.103
m=audio 49172 RTP/AVP 0
a=rtpmap 0:PCMU/8000

310

312

300

| IP HEADER 304 | TCP HEADER 306 | SIP MESSAGE 308 |

REMOTE SERVICE IDENTIFIER

BACKGROUND INFORMATION

A typical size of an Internet Protocol version 4/6 (IPv4/6) packet header is 128 bytes. The IP Packet is either composed of the Transmission Control Protocol (TCP) or the User Datagram Protocol (UDP) at the layer 3 transport layer. An IPv4 packet header includes a version field, header length field, differentiated services field, packet length field, packet identification field, flags field, fragment offset field, time-to-live field, protocol field, header checksum field, source field, and destination field commonly used for layer 3 communications. The application layer 7 Session Initiation Protocol (SIP) and the Session Description Protocol (SDP) are adjacent to the IP packet header and are comprised of application specific information commonly used for VOIP communications. A VoIP call using SIP and/or SDP communications typically consists of a Call ID field that is designed to contain a unique 32 bit identifier that tracks all of the parties in the call.

BRIEF DESCRIPTION OF THE DRAWINGS

FIG. 2 is a block diagram of exemplary components of a device that may correspond to one of the devices of FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may determine a remote service identifier (ID) associated with a VoIP call. The remote service ID may be implemented to identify messages (e.g., IPv4 packets) associated with a call across different network elements in a network. The remote service ID may be computed on any network element independently (e.g., without call information from other network elements that receive/transmit the messages) by parsing call logs of network elements. The call logs may be parsed at any time, based on time stamps included with the call logs. The remote service ID is unique and may be based on signaling system number 7 (SS7) and/or VoIP telephone number call plans (which are unique by definition).

Consistent with implementations described herein, a call tree may be determined based on a call origin. Remote service IDs may be determined for each branch of the call tree. SIP/SDP messages may be retrieved from call record databases based on the remote service IDs.

Figure 1:
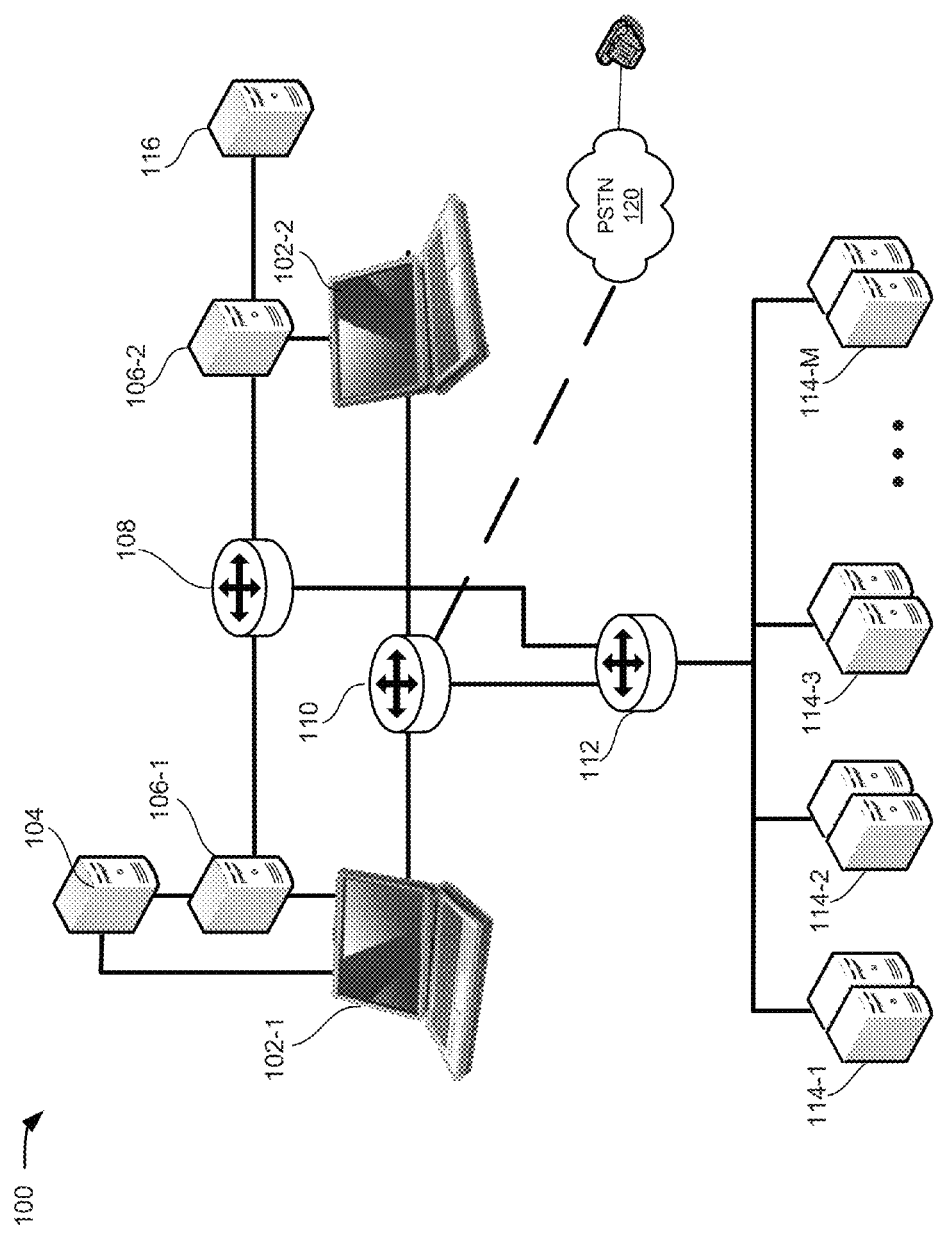
FIG. 1 depicts an exemplary network in which systems and methods described herein may be implemented.

FIG. 1 illustrates an exemplary network in which concepts described herein may be implemented. Network 100 may include one or more wired and/or wireless networks that are capable of exchanging information, such as voice, video, documents, multimedia, text, etc. For example, network 100 may include one or more public switched telephone networks (PSTNs) or another type of switched network. Network 100 may also include a number of transmission towers for receiving wireless signals and forwarding the signals toward the intended destination. Network 100 may further include one or more packet switched networks, such as an Internet protocol (IP) based network, a local area network (LAN), a wide area network (WAN), a personal area network (PAN), an intranet, the Internet, or another type of network that is capable of exchanging information.

As shown, network 100 may include user devices 102-1 and 102-2 (herein "user device 102" or "user devices 102"), a registrar device 104, proxy server devices 106-1 and 106-2 (herein "proxy server device 106" or "proxy server devices 106"), a signal copy device 108, a media copy device 110, a load balancer device 112, processing devices 114-1 through 114-M (herein "processing device 114" or "processing devices 114"), a call record database device 116, and a public network 120. In FIG. 1, network devices 102 through 116 may communicate via links that are illustrated as solid lines. For simplicity, FIG. 1 does not show other communication links (e.g., communication links between registrar device 104 and proxy server 106-2, between signal copy device 108 and media copy device 110, etc.) and elements of network, such as routers, bridges, switches, gateways, wireless access points, hubs, etc.

In the following, for simplicity, network devices 102-116 are described as applying SIP, SDP, and Real-time Transport Protocol (RTP). Depending on the implementation, other communication protocols, such as H.323, Media or Multimedia Gateway Control Protocol (MGCP), etc. may also be applied to the concepts described herein.

User devices 102 (i.e., user agent devices) may communicate with one another over network 100. In one implementation, user devices 102-1 and 102-2 may host or operate as SIP clients (e.g., SIP phones). The SIP clients may create, send, and/or receive SIP messages. In addition, the SIP clients may send or receive a media stream (e.g., RTP stream). To allow other devices in network 100 to locate the SIP clients, the SIP clients may register at registrar device 104.

Registrar device 104 may store information about SIP clients. In addition, registrar device 104 may provide the stored information to other devices in network 100. Proxy server device 106 may forward a SIP message to its intended destination. In addition proxy server device 106 may locate SIP clients and provide information about the SIP clients to other network devices or components (e.g., a software component).

Signal copy device 108 may create a copy of a signal packet (e.g., a packet that includes signaling information (e.g., a SIP packet)) between proxy server devices 106 and provide the copy to processing device 114 via load balancer device 112.

Media copy device 110 may copy packets of a media stream between user devices 102 and provide the copies to processing device 114 via load balancer device 112. By exchanging SIP messages, user devices 102 may establish a RTP channel between one another. The RTP channel may then be used to send or receive the media stream (e.g., voice data, video, etc.) between user devices 102.

Load balancer device 112 may receive copies of signal packets and a media stream from signal copy device 108 and media copy device 110, respectively. In addition, load balancer device 112 may select one of processing devices 114 and send the received copies to the selected processing device 114.

Processing device 114 may receive copies of signal packets and a media stream and process them. In one implementation, processing device 114 may record the copies in the order that they are received, for further processing or use.

Call record database device 116 may receive call records of signal packets processed for each network component. The call records may include SIP packet information and an associated time stamp, as described herein below.

Public network 120 may include a PSTN, a local area network (LAN), a wide area network (WAN), such as a cellular network, a satellite network, a fiber optic network, a private WAN, or a combination of the Internet and a private WAN, etc., that is used to transport data. Although shown as a single element in FIG. 1, public network 120 may include a number of separate networks that function to provide services to user devices 102.

Depending on the implementation, network 100 may include additional, fewer, different, or different arrangement of devices than those illustrated in FIG. 2. For example, in one implementation, network 100 may include redirect server devices, additional user devices, additional proxy server devices, additional registrar devices, etc. In another example, the functionalities of one or more devices 102-116 may be integrated into other devices 102-116. For example, registrar device 104 may be combined with proxy server device 106-1.

FIG. 2 is a diagram of exemplary components of a device 200. Each of user device 102, registrar device 104, proxy server device 106, signal copy device 108, media copy device 110, load balancer device 112, processing device 114, and call record database device 116 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processing unit 220 executing machine-readable instructions contained in a computer-readable medium, such as memory 260. A computer-readable medium may include a non-transitory memory device. A memory device may include space within a single physical memory device or spread across multiple physical memory devices. The machine-readable instructions may be read into memory 260 from another computer-readable medium or from another device via communication interface 250. The machine-readable instructions contained in memory 260 may cause processing unit 220 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figures 3A, 3B:
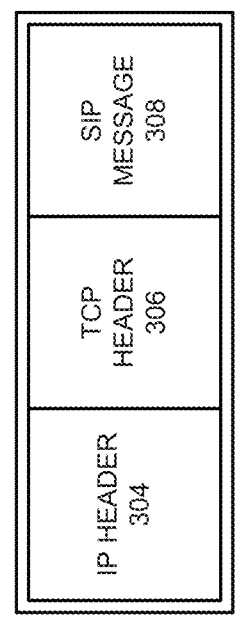
FIG. 3A is a diagram of an exemplary Session Initiation Protocol (SIP) packet.
FIG. 3B is a diagram of an exemplary SIP message.

FIG. 3A depicts an exemplary SIP packet 300. As shown in FIG. 3, SIP packet 300 may include an IP header 304, a Transmission Control Protocol (TCP) or User Datagram Protocol (UDP) header 306, and a SIP message 308. For simplicity, packet 300 does not show other components of packet 300.

IP header 304 and TCP header 306 may include information for a network to provide reliable transport services to SIP packet 300. IP header 304 and TCP/UDP header 306 may include, for example, source and destination IP addresses, source and destination port numbers, a packet sequence number, etc.

SIP message 308 may include a type of message under the SIP, such as, for example, a REGISTER message, INVITE message, ACK message, CANCEL message, BYE message, OPTIONS message, error message, etc.

FIG. 3B shows an exemplary SIP message 308 (e.g., INVITE message). As shown, SIP message 308 may include a SIP message header 310 and a SIP message body 312.

SIP message header 310 may include a call identifier (call ID), information about user agents that are to send/receive SIP packet 300, an indication of the type of SIP message 308, an indication of the type of information in the body of SIP message 308, etc.

SIP message body 312 may include, for example, a SDP message that describes a RTP media stream. Based on the SDP message, user devices 102-1 may send or receive a RTP media stream. The media stream may include RTP packets. In FIG. 1, media copy device 110 may send copies of RTP packets from the media stream to load balancing device 112.

In implementations described herein, information associated with VoIP calls may be determined based on a two part system. The first system, a remote service identifier (ID) system determines an identifier associated with each VoIP call as described below with respect to FIG. 4, and the second system, a telephone number branch system, determines a telephone number branch as described below with respect to FIGS. 5A, 5B and 6. The systems may be implemented in conjunction with each other on a device, such as user device 102, which receives the logged output of network components or accesses the logged output of network components stored, for example, at call record database device 116. Although implementations are described with respect to SIP messages, the principles described herein may be applied to other signaling protocols, such as SDP, etc.

Figure 4:
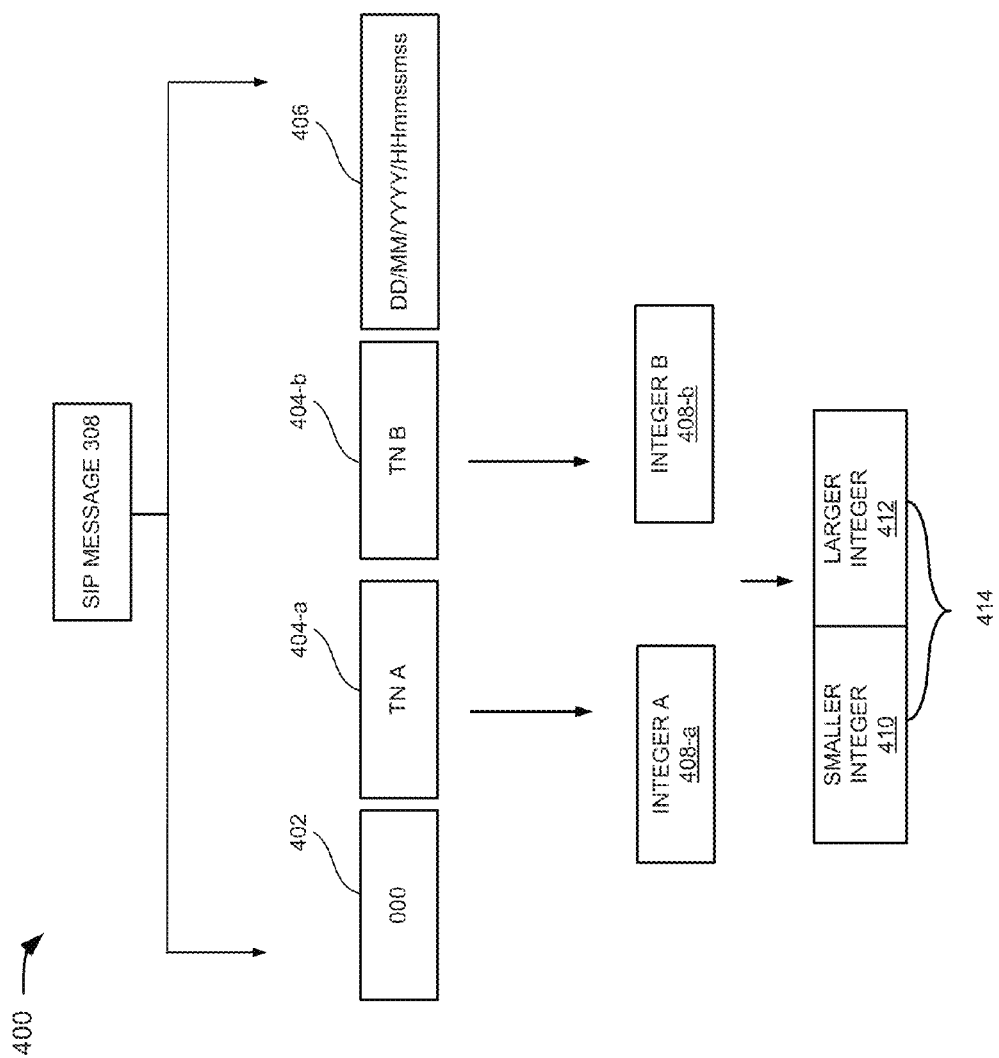
FIG. 4 is a flowchart of an exemplary process associated with a remote service ID system.

FIG. 4 is a flowchart of exemplary processes associated with a remote service ID system 400. Remote service ID system 400 may be executed on/implemented for logged output (e.g., SIP message 308) of each network element (e.g., registrar device 104, proxy server device 106, signal copy device 108, media copy device 110, load balancer device 112, and processing device 114) in a network, such as network 100, for example, based on instructions associated with service personnel for network 100. As shown, remote service ID system 400 may receive the log output of a network element involved in a VoIP call (with the SIP/SDP packet information). For example, the network element may output the logged output to a device (such as user device 102) that requests the logged output. Remote service ID system 400 may include machine-readable instructions that may be performed by the device that receives/accesses the logged output of the network element.

SIP message 308 may include a SIP code 402 (e.g., REGISTER, INVITE, ACK, CANCEL, BYE, etc.), a "From" value 404-a (e.g., sending telephone number (TN A 404-a)), a "To" value 404-b (e.g., receiving telephone number (TN B 404-b)), and a time 406 associated with the SIP packet. Remote service ID system 400 may statefully (i.e., the packets are inspected relative to known connections) inspect the logged output of the network element to determine the "From" value (e.g., TN A 404-a and associated information in an addressable VoIP format, such as a website, an IP address, etc.), and the "To" value (e.g., TN B 404-b and associated information), when remote service ID system 400 pulls the TN information. The format can be legacy SS7 or VOIP.

Remote service ID system 400 may extract the TNs 404 from the "From" value and the "To" value of SIP message 308. For example, remote service ID system 400 may separately identify the TN from the associated information, such as a website, an IP address, etc.

According to one implementation, remote service ID system 400 may perform additional recognition of the TN. Remote service ID system 400 may systematically examine the TN (e.g., from right to left in order) to identify a format of origin of the TN based on formats defined by the telephone numbering plan (e.g., from SS7). For example, SIP message 308 may include a "From" value such as SIP:+18148819525@199.173.94.88:5060. Note that the To and From values may include symbols that are non-numerical (e.g., "+", "@", letters, etc.) and may not be readily mathematically manipulated. Remote service ID system 400 may determine if the From or To values for the call is SS7 or VOIP format. Remote service ID system 400 may extract the TN, +18148819525, (i.e., separate the TN from additional symbols. Remote service ID system 400 may systematically evaluate the TN from right to left to determine, for example, that the format, area code exchange code subscriber number (NPA-NXX-####), is from the North American numbering plan area (NANPA) US (because a +1 is to the left of that format). Remote service ID system 400 may be implemented at different network elements associated with a same call to determine the TN in a uniform manner (e.g., regardless of a NANPA TN being logged with +1, 1, etc., at the network element).

In a similar manner, remote service ID system 400 may identify predefined format schemes for international calls based on the other telephone numbering plans for Europe, Middle East and Africa (EMEA), such as + country code access code subscriber number (### XX-YY-ZZZ-ZZZZ). In some instances in which a country code is not included, the call format is by default a format scheme such as NPA-NXX-####, or other well defined phone number formats. Alternatively, in instances in which VoIP supports the non-SS7 addressing, remote service ID system 400 may take the entire "From" value of the SIP/SDP message (e.g., John.doe@company.com). Remote service ID system 400 may also identify a time stamp 406 (e.g., in a time format DD/MM/YYYY/HH/mmssms) of SIP message 308.

Remote service ID system 400 may isolate the "From" value 404-a. Remote service ID system 400 may determine American Standard Code for Information Exchange (ASCII) character values of each symbol and transform each symbol into a decimal integer representation of the symbol, integer value 408-a (i.e., each symbol is replaced in sequence by the ASCII character value). The transformed output is a hash specific value that is unique and may be manipulated mathematically (unlike some symbols). For example, remote service ID system 400 may transform "+18148819525@199.173.94.88" based on hash function to yield a hash value: "43495649525656495753505364495757464955514657524656560".

Remote service ID system 400 may transform the TN "+18148819525" to a corresponding integer value equivalent (i.e., hash value) integer 408-a of "43495649525656495753505053". Similarly, remote service ID system 400 may perform the same operation on the "To" value 404-b of the SIP message 308 to determine a corresponding integer value equivalent, integer 408-b.

Remote service ID system 400 may determine an integer value equivalent 408 for each "From" and "To" value 404 based on SS7 qualifiers or, alternatively, the entire VoIP addressable format. The integer value equivalents 408 are specific and unique values. Remote service ID system 400 may determine the integer value equivalents 408 during midstream of parsing the switch fabric log for network 100.

Remote service ID system 400 may determine a relative size of the integer value equivalents 408 of the "From" and "To" values 404 with respect to each other (i.e., a smaller integer 410 and a larger integer 412). The "From" and "To" in the SIP/SDP communication may be transposed relative to the direction of the IPv4/6 packet for the call segment (i.e., "From" and "To" parties may change during communication between two parties). Remote service ID system 400 may take the smaller value 410 of the integer value equivalents 408 and concatenate it with the larger value 412 to form remote service ID 414. The values may be concatenated in a predefined sequence (e.g., larger value 412 first or smaller value 410 first). The predefined sequence ensures that the remote service ID 414 is constant between the same TNs 404, regardless of the direction of transmission of messages in network 100.

In instances in which integer value sizes differs between TN A 404-a and TN B 404-b, the probability that TN A 404-a's integer value will be equal to TN B 404-b's integer value is zero. In instances in which TN A 404-a and TN B 404-b have the same integer length in numbers, the chance of drawing identical integers is minute, and when a time factor is imposed for the VoIP call, the probability of retrieving two identical values decreases exponentially. Additionally, in instances in which the TNs 404 (or VoIP addresses) are either VoIP or SS7, the formats bar transmission from a same VOIP or SS7 TN and the probability is further reduced that TN A 404-a and TN B 404-b integer values will ever be identical.

Remote service ID 414 may be a relatively unique value based on the size of those integers. For example, for SS7 values described above: "52495051545549555453" concatenated with "43495649525656549575350453" is "524950515455495554534349564952565649575350453". When remote service ID 414 is combined with a bounded time interval the probability of additional (false positive) records is decreased.

Remote service ID system 400 may be implemented to compute remote service ID 414 on any network element independently without call knowledge from the other network elements ongoing work when parsing call logs. Remote service ID system 400 may parse the call logs independent of time based on time stamps associated with the remote service IDs 414. Uniqueness of the remote service IDs 414 is based on SS7 & VoIP Telephone Number Call plans, which provide unique identifiers by definition. Additionally, remote service IDs 414 associated with a group of calls may be determined (i.e., computed) for multiple network elements by call correlating systems (not shown) that implement remote service ID systems 400 in association with the logged output of each network element. Call correlating systems may be implemented in conjunction with remote service ID systems 400 to determine remote service identifiers 414 associated with a range of VoIP calls (from a group of VoIP calls). The call correlating systems may scale in a fashion such that only network addressing may be a limitation.

Figure 5A:
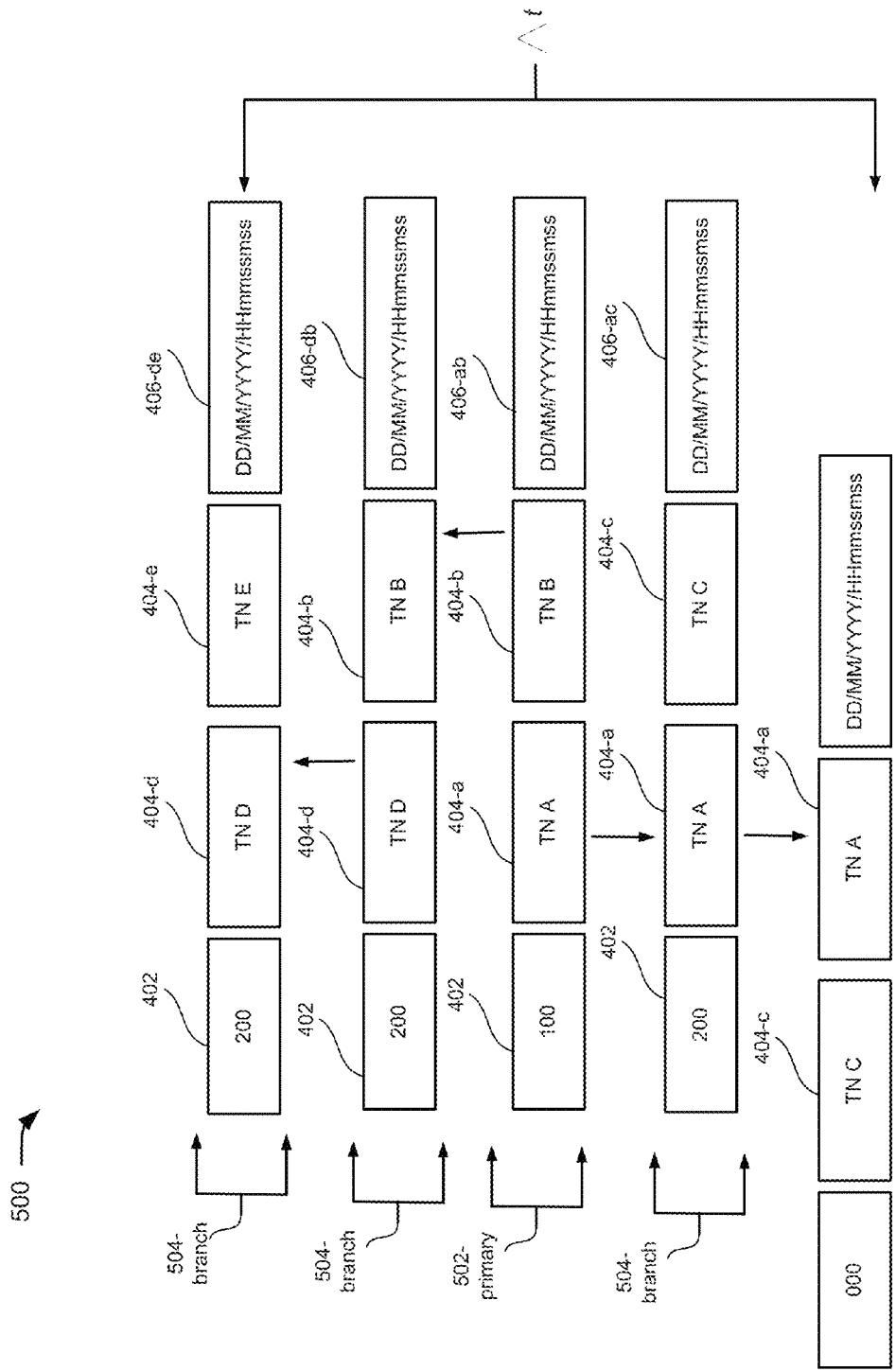
FIG. 5A is a flowchart of an exemplary process associated with a telephone number branch system.
Figure 5B:
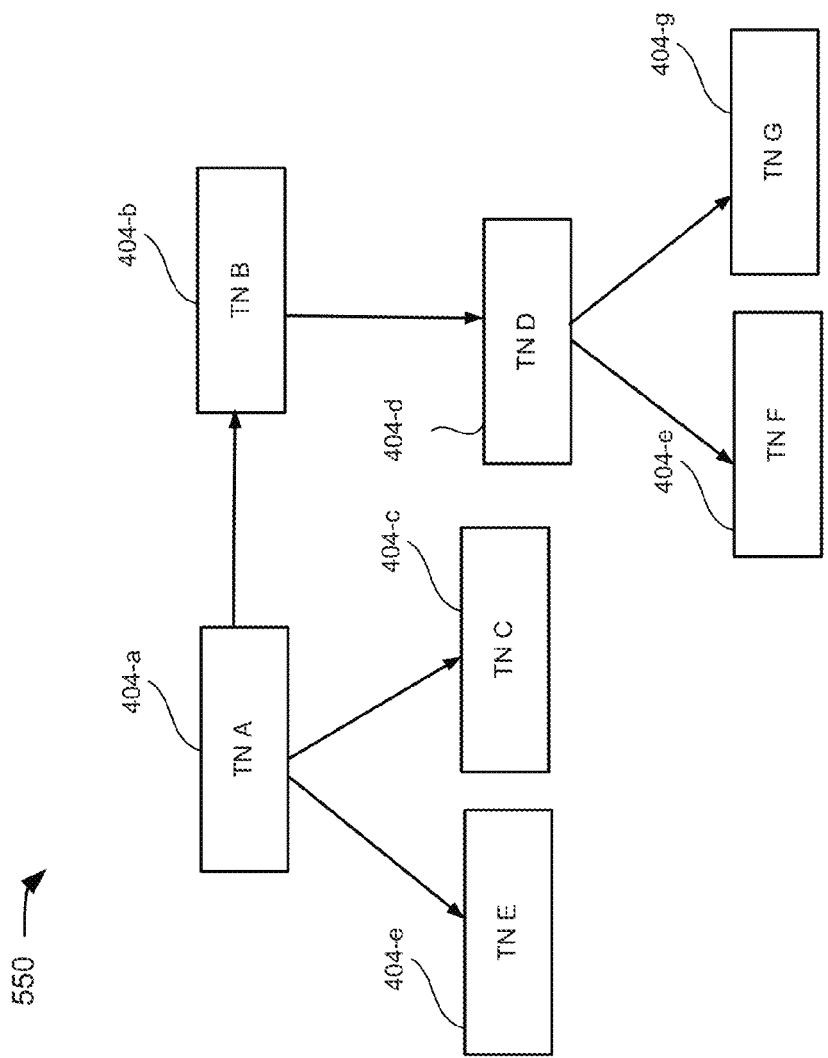
FIG. 5B is a flowchart of another exemplary process associated with the telephone number branch system.

FIGS. 5A and 5B are block diagrams of exemplary processes associated with a telephone number branch system 500 (FIG. 5A) and an associated call tree 550 (FIG. 5B). FIGS. 5A and 5B provide an example of representation of how complex calls may branch.

As shown in FIG. 5A, telephone number branch system 500 may identify a primary call key 502 and (one or more) branch keys 504-a through 504-x (hereinafter "branch key 504" or "branch keys 504"). The call origin begins at primary call key 502 (at a defined time) and branching of the call (as indicated by subsequent branch keys 504) may occur at times subsequent to the call origin. Each of primary call key 502 and the branch keys 504 include an associated time stamp 406. Time stamps 406 associated with calls between particular parties are denoted by a post script that includes a letter associated with each party (e.g., a time stamp 406-ab denotes a time stamp associated with communication between TN A 404-a and TN B 404-b).

Figure 6A:
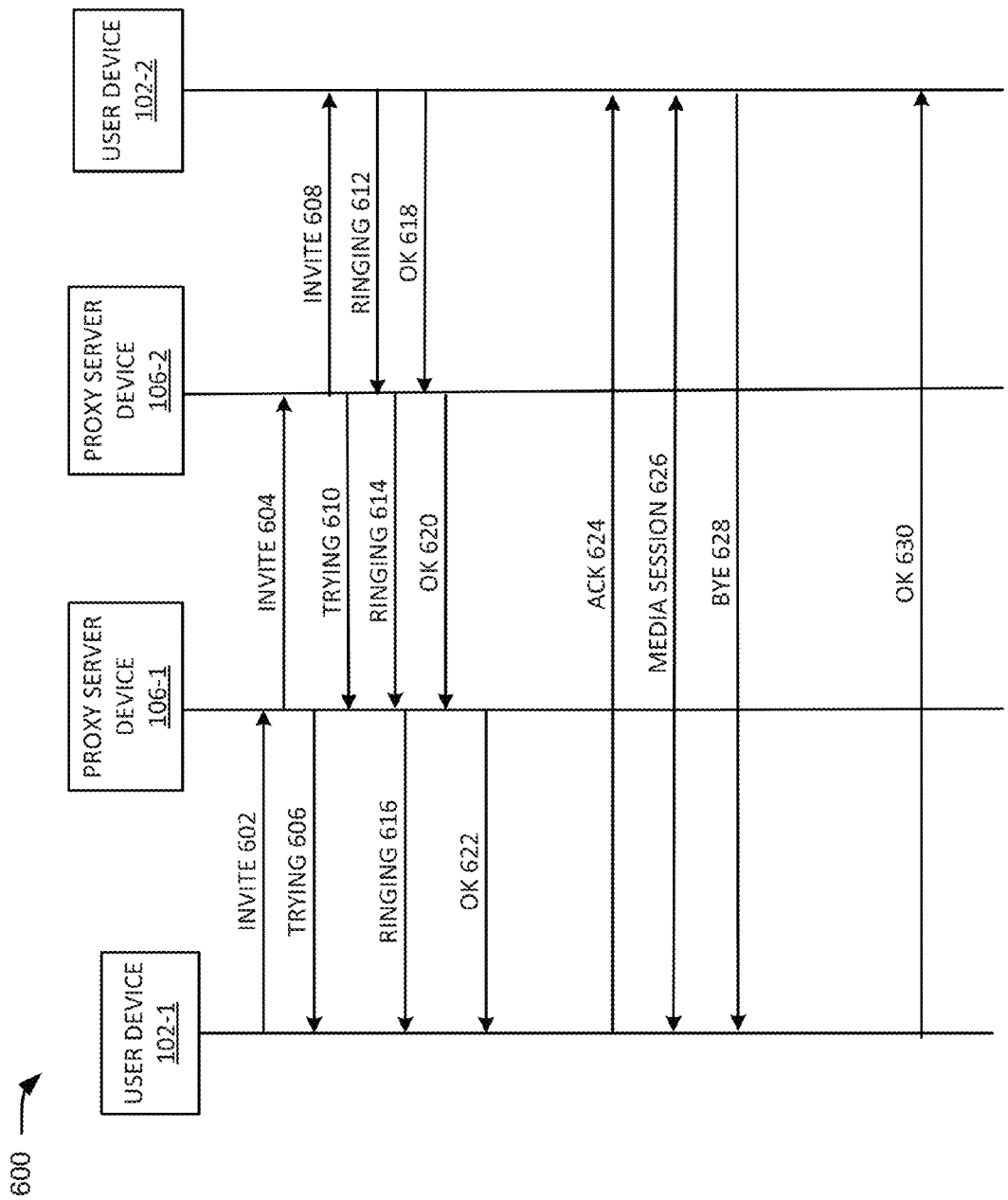
FIGS. 6A and 6B are exemplary diagrams of call flows based on session control messages.
Figure 6B:
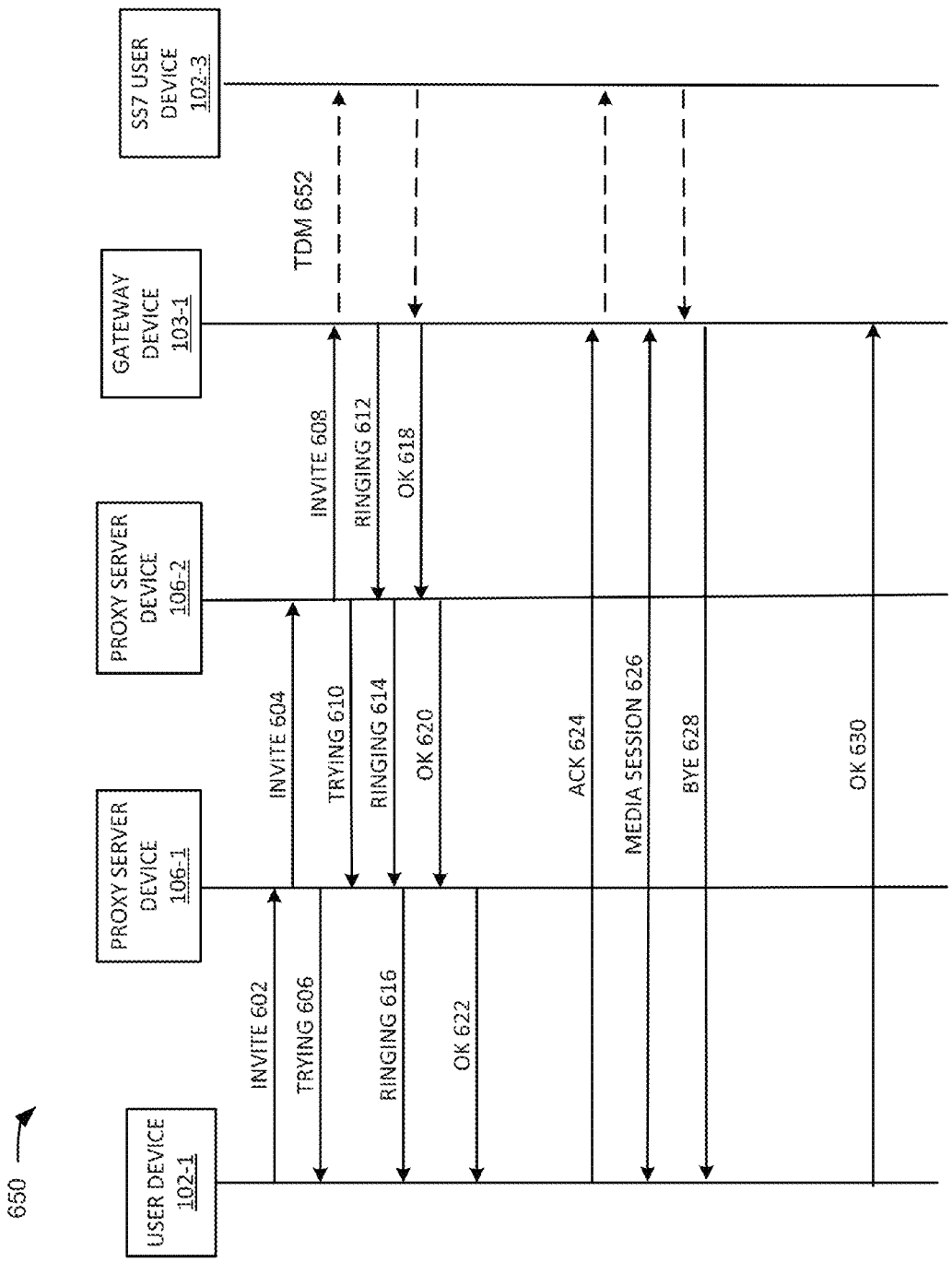

Telephone number branch system 500 may identify TN A 404-a through TN D 404-b as a set of branch sub-keys that may be searched to build call branches. As illustrated, in instances in which there are more than two parties to a VoIP call, a call tree 550 (such as shown in FIG. 5B) may be assembled based on the remote service IDs 414 (between each pair of TNs 404) may be used to extract SIP/SDP messages 308 in a given time (i.e., over a predetermined time). Telephone number branch system 500 may determine a call flow based on time stamps 406 associated with the SIP/SDP messages 308, such as shown in FIGS. 6A and 6B herein below.

Telephone number branch system 500 may be implemented when calls involve more than two TNs 404, and consequently more than one remote service ID 414. For example, telephone number branch system 500 may be implemented in the case of a conference call where IP Media services are being used and in VoIP call scenarios where the TN is being transferred mid-stream from one user agent (i.e., user device 102) to another.

Telephone number branch system 500 may take the call origin and map the call origin to all TN destinations (e.g., a call that begins between TN A 404-a and TN B 404-b may be mapped to a destination TN C 404-c). Telephone number branch system 500 may determine the mapping based on the actual "From" and "To" components from SIP/SDP messages 308. Alternatively, telephone number branch system 500 may determine the mapping based on TNs 404 (i.e., the branch sub-keys previously described). Telephone number branch system 500 may determine the call mapping faster based on branch sub-keys because integer searches are always faster in sorted indexes.

As shown in FIG. 5B, call tree 550 may be assembled based on the call origin (between TN A 404-a and TN B 404-b) and subsequent TNs 404 (e.g., TN C 404-c through TN G 404-g) to which the call branches. Once call tree 550 is assembled for call record database device 116 then all of the remote service IDs for the call may be extracted. Telephone number branch system 500 may use the remote service IDs to retrieve all of the SIP/SDP messages 308 in a given time period from call record database device 116.

Telephone number branch system 500 and remote service ID system 400 may be implemented to perform middle tier computation to stage calls for IT reporting. Remote service ID system 400 and telephone number branch system 500 may be implemented in conjunction with each other in a specifically defined time period to provide uniqueness. Remote service ID system 400 may extract SIP/SDP messages 308 that are all time stamped. Telephone number branch system 500 may sort the SIP/SDP messages 308 in time based on the time stamps. Telephone number branch system 500 may determine a call flow based on the set of SIP/SDP messages 308. The call flow may be presented in traditional call flow terms or in a call ladder format (FIG. 6A) as defined by the Internet Engineering Task Force (IETF) SIP/SDP Networking groups.

FIGS. 6A and 6B are exemplary diagrams, 600 and 650 respectively, of call flows based on session control messages.

As shown in FIG. 6A, telephone number branch system 500 may determine the call flow based on the set of SIP/SDP messages 308 (e.g., INVITE, trying, ringing, BYE, etc.), the network components (e.g., user device 102-1, user device 102-2, proxy server device 106-1, proxy server device 106-2) and time stamps associated with each SIP message 308. The call flow may be graphically rendered on the graphic user interface (GUI) of a user device 102 associated with network personnel.

In FIG. 6A, user device 102-1 sends an INVITE request 602 to user device 102-2 via proxy server device 106-1. Proxy server device 106-1 forwards the INVITE to proxy server device 106-2 (604). Proxy server device 106-2 may also return a trying message to user device 102-1 (606). Proxy server device 106-2 forwards the INVITE to user device 102-2 (608). Proxy server device 106-2 may also return a 100 trying message to proxy server device 106-1 (610).

User device 102-2 may send a 180 ringing response to proxy server device 106-2 (612). Proxy server device 106-2 may forward the 180 ringing response to proxy server device 106-1 (614). Proxy server device 106-1 may forward the 180 ringing response to user device 102-1 (616).

User device 102-2 may send a 200 OK response to proxy server device 106-2 (618). Proxy server device 106-2 may forward the 200 OK response to proxy server device 106-1 (620). Proxy server device 106-1 may forward the 200 OK response to user device 102-1 (622).

User device 102-1 may send an ACK response to user device 102-2 (624). User device 102-1 and user device 102-2 may conduct a media session (626). For example, user device 102-1 and user device 102-2 may have a VoIP call. User device 102-2 may send a BYE message to user device 102-1 to signal the end of the media session (628). User device 102-1 may send a 200 OK response to user device 102-2 (630).

Although communications in FIG. 6A are shown between two user devices 102, communications may take place between gateway devices and other devices in network 100 (e.g., between SS7 based devices), such as a gateway device 103-1 and SS7 user device 102-3, shown in FIG. 6B.

In FIG. 6B, each segment of a VoIP call may implement SS7 signaling and introduce a potential breakdown of a Call ID based tracking system. Different vendors associated with network elements may cause variations in the Call ID (e.g., when a VoIP call is transmitted via a SIP gateway (i.e., via gateway device 103-1) and is translated into legacy SS7 protocol as in FIG. 6b). Communication between gateway device 103-1 and SS7 user device 102-3 may include time division multiplexing (TDM) 852. Remote service ID system 400 may be implemented to produce unique constant identifiers (i.e., remote service IDs 414) that may track a complex call across devices associated with different vendors in the network 100.

Figure 7:
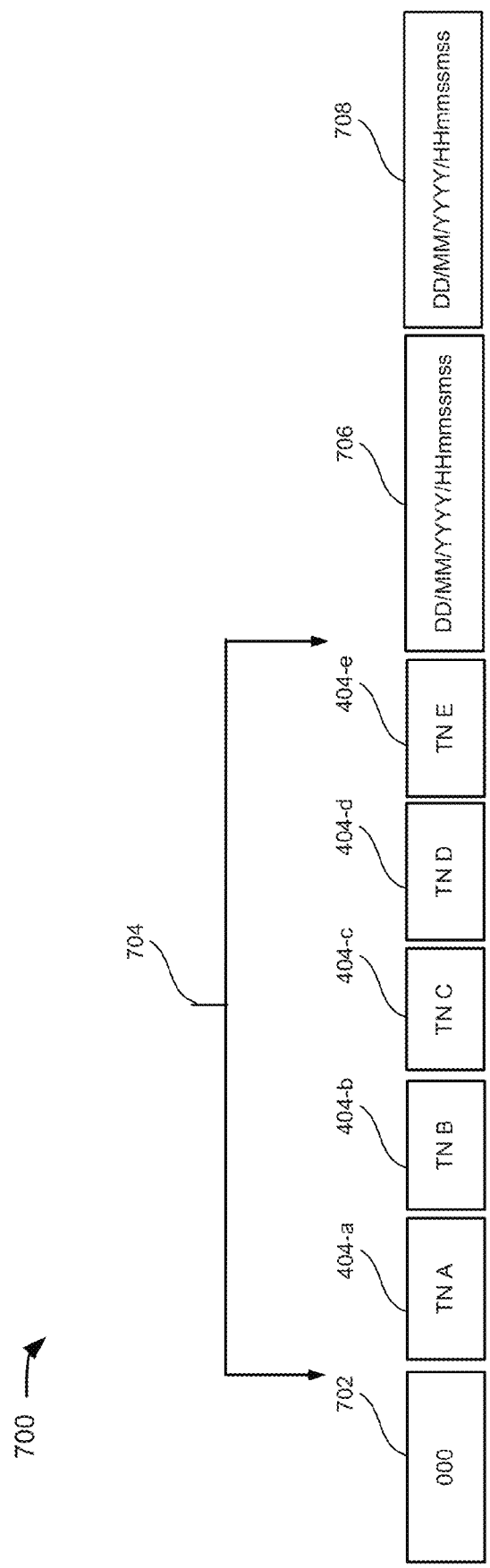
FIG. 7 is a block diagram of a master call key system.

FIG. 7 is a block diagram of a master call key system 700. Master call key system 700 includes a call type 702, a master call key 704, a call start time 706 and a call end time 708.

As shown in FIG. 7, master call key 704 may be a master call data record key associated with a call data record for a VoIP call that involves more than two parties. Master call key 704 may include branch sub-keys (e.g., TN A 404-a, TN B 404-b, TN C 404-c, etc.) associated with the VoIP call. Each remote service ID 414 associated with the VoIP call is configurable to be determined based on the master call key 704. Master call key system 700 may provide access to a call data record with larger key types derived from the branch sub-keys for faster IT Web report generation for network operations and customer support for the telecom provider.

Figure 8:
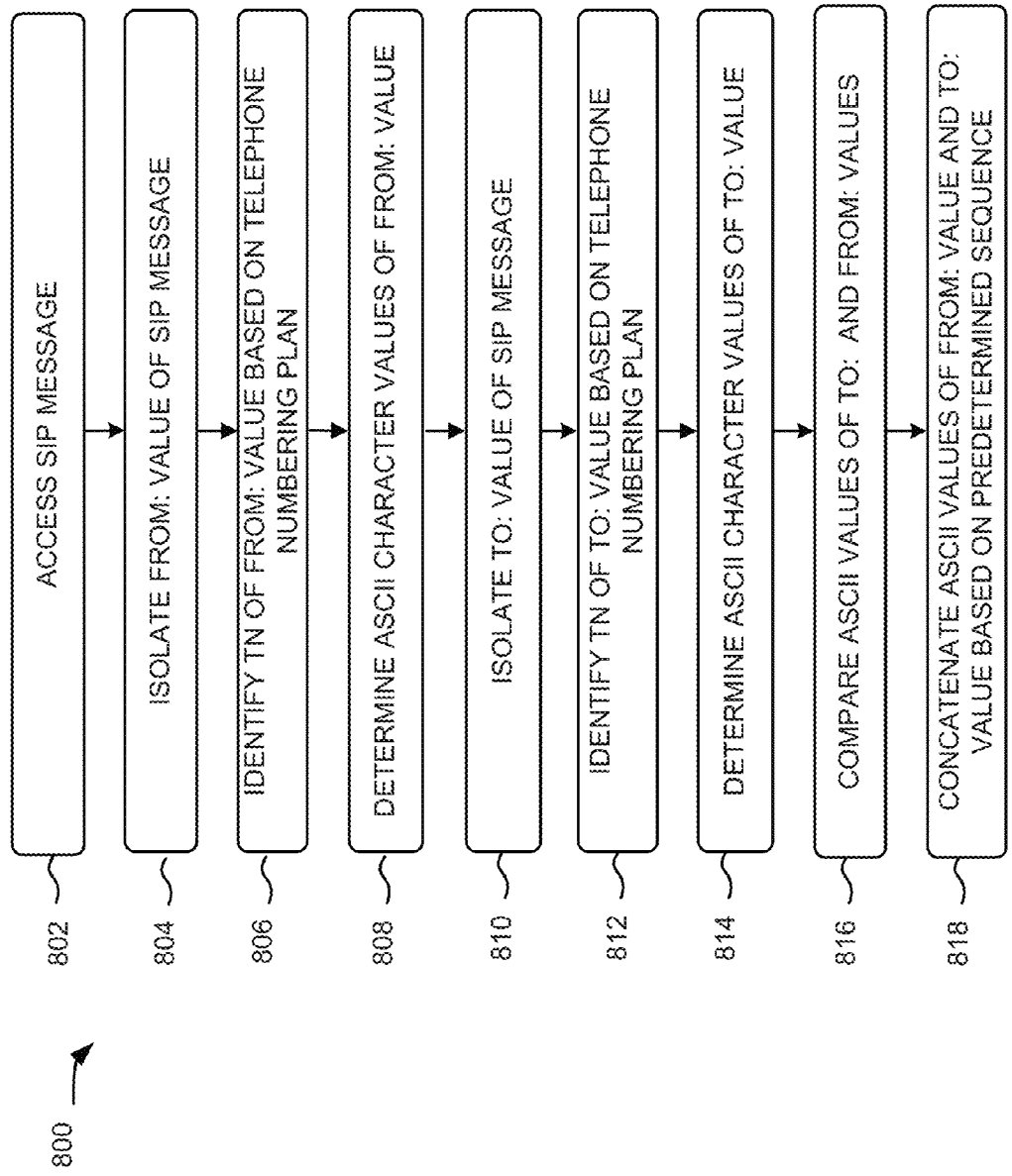
FIG. 8 is a flow chart of an exemplary process for determining a remote service ID according to implementations described herein.

FIG. 8 is a flow chart of an exemplary process for determining a remote service ID according to implementations described herein. In one implementation, process 800 may be performed by user device 102. In another implementation, some or all of process 800 may be performed by another device or group of devices, including or excluding user device 102. User device 102 may implement machine-readable instructions associated with remote service ID system 400 as described hereinabove with respect to FIG. 4.

As shown in FIG. 8, user device 102 may access the logged output of a network element in network 100 (block 802). For example, user device 102 may access a SIP message 308 from logged output of proxy server device 106-1. Alternatively, user device 102 may access a SIP message 308 from call records for network 100 stored in call record database device 116. In one embodiment, user device 102 may access SIP messages 308 output from devices (not shown) in a vendor and network element agnostic manner.

User device 102 may examine the SIP message 308 to isolate a "From" value of the SIP message 308 (block 804).

User device 102 may examine the "From" value to identify the origin of the TN based on formats defined by telephone numbering plans, such as SS7 (block 806). User device 102 may use the origin of the TN to enhance sorting of the remote service IDs 414, for example based on country of origin, etc.

User device 102 may determine ASCII character values of the "From" value (block 808).

User device 102 may examine the SIP message 308 to isolate a "To" value of the SIP message 308 (block 810).

User device 102 may examine the "From" value to identify the origin of the TN based on formats defined by telephone numbering plans, such as SS7 (block 812).

User device 102 may determine ASCII character values of the "To" value (block 814).

User device 102 may compare the hashed value of the "From" value to the hashed value of the "To" value to determine a smaller integer and a larger integer (block 816).

User device 102 may concatenate the hashed value of the "From" value and the hashed value of the "To" value based on a predetermined sequence to form a remote service ID 414 (block 818).

Figure 9:
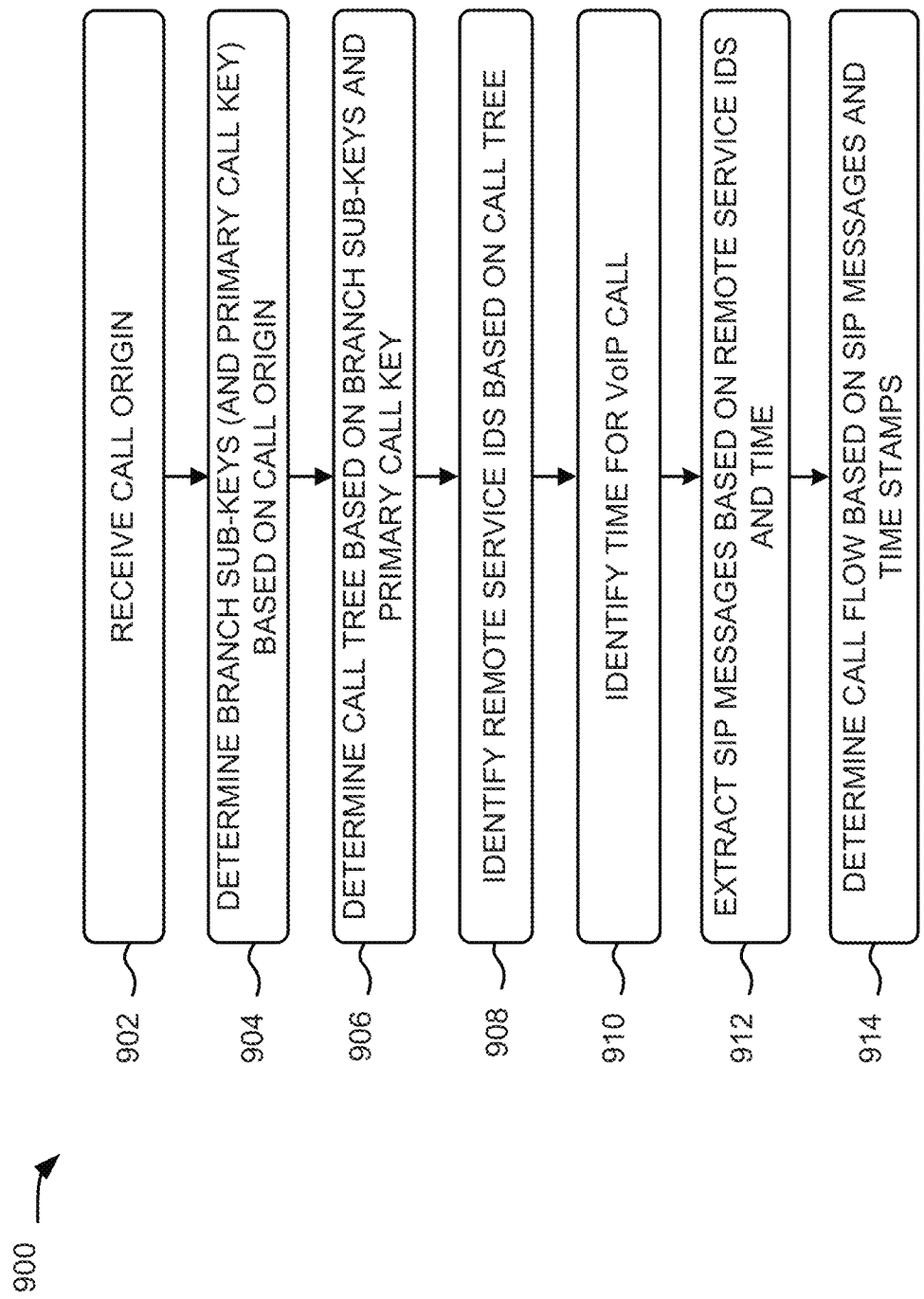
FIG. 9 is a flow chart of an exemplary process for determining a call tree according to implementations described herein.

FIG. 9 is a flow chart of an exemplary process for determining call tree 550 according to implementations described herein. In one implementation, process 900 may be performed by user device 102. In another implementation, some or all of process 900 may be performed by another device or group of devices, including or excluding user device 102. User device 102 may implement machine-readable instructions associated with telephone number branch system 500 and call tree 550 as described hereinabove with respect to FIGS. 5A and 5B.

As shown in FIG. 9, user device 102 may identify a call origin associated with a VoIP call for more than two parties (block 902). For example, user device 102 may receive the call origin from network operations or customer support personnel associated with network 100. The call origin may be implemented as a primary call key 502 that includes TNs 404.

User device 102 may determine branch sub-keys based on the primary call key 502 (block 904). For example, user device 102 may determine the branch sub-keys by mapping the TNs 404 from the primary call key 502 to all telephone number destinations.

At block 906, user device 102 may determine a call tree 550 (e.g., as shown in FIG. 5B) based on the branch sub-keys and the primary call key 502 (i.e., user device 102 may assemble call branches independent of the network elements involved in the VoIP call).

User device 102 may determine remote service IDs 414 based on call tree 550 (block 908). User device 102 may determine a bounded time in which a VoIP call occurs (block 910). The bounded time may provide a search range for the VoIP call.

User device 102 may extract SIP messages 308 based on remote service IDs 414 associated with each branch of the call tree 550 (block 912). For example, user device 102 may identify SIP messages 308 in a predetermined time based on remote service IDs 414 (e.g., user device 102 may identify SIP messages 308 based on remote service IDs 414 that include paired TNs 404 from the call tree 550).

User device 102 may determine a call flow based on the time stamps associated with the remote service IDs 414 (block 912). For example, user device 102 may assemble a call flow, such as shown in FIG. 7.

Systems and methods described herein may enable determination of a remote service identifier (ID). The remote service ID may be implemented to identify IPv4 packets associated with a call across different network elements that are sometimes translated into SS7 TDM signaling at a PSTN gateway. The remote service ID may be computed on any network element independently when a querying device (e.g., a device associated with operational or customer support personnel) is parsing call logs. The scheme shown here is entirely vendor and network element independent. The systems and method may enhance accuracy and range of reporting on the VoIP calls for operational and customer support.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8 and 9, the order of the blocks may be modified in other implementations. Further, non-dependent blocks may be performed in parallel.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions—it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer implemented method comprising: receiving at least one signaling protocol message associated with a voice over Internet Protocol (VoIP) call;
    identifying a From value of the at least one signaling protocol message, wherein the From value includes at least one symbol; converting each symbol of the From value to a corresponding American Standard Code for Information Exchange (ASCII) decimal value;
    identifying a To value of the at least one signaling protocol message, wherein the To value includes at least one symbol; converting each symbol of the To value to a corresponding ASCII decimal value; comparing the ASCII decimal value of the From value to the ASCII decimal value of the To value to determine a larger integer and a smaller integer; and
    concatenating the larger integer and the smaller integer to form a remote service identifier based on a predetermined sequence.

2. The computer implemented method of claim 1, wherein the signaling protocol includes one or more of session description protocol, session initiation protocol, or distributed protocol for distributed information acquisition.

3. The computer implemented method of claim 1, wherein receiving the at least one signaling protocol message comprises accessing the at least one signaling protocol message logged at a network component associated with VoIP call processing or at a call record database device.

4. The computer implemented method of claim 1, further comprising: identifying the VoIP call in a predetermined time based on the remote service ID and a time stamp associated with the at least one signaling protocol message.

5. The computer implemented method of claim 1, wherein identifying the From value and the To value of the at least one signaling protocol message further comprises:
    determining a telephone number component of the From value or the To value based on a signaling system number 7 (SS7) telephone numbering plan.

6. The computer implemented method of claim 5, wherein the SS7 telephone numbering plan includes one of Europe, Middle East and Africa, or North American numbering plan area.

7. The computer implemented method of claim 1, wherein converting each symbol of the From value and converting each symbol of the To value further comprises:
    hashing the From value based on an entire VoIP addressable scheme of the From value; and
    hashing the To value based on an entire VoIP addressable scheme of the To value.

8. The computer implemented method of claim 1, wherein the predetermined sequence further comprises: placing the smaller integer before the larger integer.

9. The computer implemented method of claim 1, wherein the at least one signaling protocol message includes a plurality of signaling protocol messages, further comprising:
    identifying a call origin associated with a VoIP call for more than two parties;
    determining at least one destination address based on the call origin; and
    determining a call tree based on the call origin, and the at least one destination address.

10. The computer implemented method of claim 9, wherein the call origin and the at least one destination address comprise corresponding ASCII decimal values.

11. The computer implemented method of claim 9, further comprising:
    determining call tree remote service IDs based on the call tree; extracting signaling protocol messages based on the call tree remote service IDs and a predetermined time, wherein each of the call tree remote service IDs include an associated time stamp; sorting the signaling protocol messages based on the associated time stamps for the call tree remote service IDs; and
    determining a call flow based on the associated time stamps and the signaling protocol messages.

12. The computer implemented method of claim 9, further comprising:
    identifying associated time stamps based on the branch sub-keys and the primary call key;
    identifying a set of messages based on the branch sub-keys and the primary call key.

13. The computer implemented method of claim 12, further comprising:
    determining a master call key based on the branch sub-keys; identifying a start time and an end time for the VoIP call associated with the master call key; and storing the master call key in association with the start time and the end time, wherein each remote service ID associated with the VoIP call is configurable to be determined based on the master call key.

14. A device, comprising: a memory to store a plurality of instructions; and
    a processor configured to execute instructions in the memory to: receive at least one signaling protocol message from a voice over Internet Protocol (VoIP) call;

identify a From value of the at least one signaling protocol message, wherein the From value includes at least one symbol;

convert each symbol of the From value to a corresponding American Standard Code for Information Exchange (ASCII) decimal value; identify a To value of the at least one signaling protocol message, wherein the To value includes at least one symbol; convert each symbol of the To value to a corresponding ASCII decimal value; compare the ASCII decimal value of the From value to the ASCII decimal value of the To value to determine a larger integer and a smaller integer; and concatenate the larger integer and the smaller integer to form a remote service identifier based on a predetermined sequence.

15. The device of claim 14, wherein the processor is further configured to:

determine remote service identifiers associated with a range of VoIP calls from a group of VoIP calls based on a call correlating system.

16. The device of claim 14, wherein, when receiving the at least one signaling protocol message, the processor is further configured to:

access the at least one signaling protocol message logged at a network component associated with VoIP call processing or at a call record database device.

17. The device of claim 14, wherein the signaling protocol includes one or more of session description protocol, session initiation protocol, or distributed protocol for distributed information acquisition.

18. The device of claim 14, wherein the at least one signaling protocol message includes a plurality of signaling protocol messages, and the processor is further configured to:

identify a call origin associated with a VoIP call for more than two parties; determine at least one branch sub-key and a primary call key based on the call origin; determine a call tree based on the at least one branch sub-key and the primary call key; identify remote service IDs based on the call tree; identify a bounded time for a VoIP call; extract Session Initiation Protocol (SIP) messages based on the remote service IDs and the bounded time; and determine call flow based on SIP messages and time stamps associated with the SIP messages.

19. The device of claim 14, wherein, when identifying the From value and the To value of the at least one signaling protocol message, the processor is further configured to:

determine a telephone number component of the From value or the To value based on a signaling system number 7 (SS7) telephone numbering plan.

20. A non-transitory computer-readable medium, including instructions executable by at least one processor, the computer-readable medium comprising one or more instructions for causing a processor to: identify a call origin associated with a voice over Internet Protocol (VoIP) call for more than two parties; determine at least one branch sub-key and a primary call key based on the call origin; determine a call tree based on the at least one branch sub-key and the primary call key; identify remote service identifiers (IDs) based on the call tree, wherein each remote service ID identifies a VoIP call based on a hash function conversion of a From value and a To value associated with a signaling pair for each branch of the call tree; identify a bounded time for a VoIP call; identify that each symbol of the To value and each symbol of the From value have been converted to corresponding ASCII decimal values; identify that the ASCII decimal value of the From value and the ASCII decimal value of the To value have been compared to determine a larger integer and a smaller integer; identify a predetermined sequence in which the larger integer and the smaller integer have been concatenated to form the remote service IDs; extract Session Initiation Protocol (SIP) messages based on the remote service IDs and the bounded time; and determine call flow based on SIP messages and time stamps associated with the SIP messages.

* * * * *